United States Patent
Mawby

(10) Patent No.: US 10,514,321 B2
(45) Date of Patent: *Dec. 24, 2019

(54) TIRE UNIFORMITY THROUGH IDENTIFICATION OF PROCESS EFFECTS USING REGRESSION ANALYSIS WITHOUT AZIMUTH DATA

(71) Applicant: William David Mawby, Greenville, SC (US)

(72) Inventor: William David Mawby, Greenville, SC (US)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 1130 days.

This patent is subject to a terminal disclaimer.

(21) Appl. No.: 14/769,297

(22) PCT Filed: Mar. 29, 2013

(86) PCT No.: PCT/US2013/034612
§ 371 (c)(1),
(2) Date: Aug. 20, 2015

(87) PCT Pub. No.: WO2014/158188
PCT Pub. Date: Oct. 2, 2014

(65) Prior Publication Data
US 2015/0377743 A1    Dec. 31, 2015

(51) Int. Cl.
G01M 17/02    (2006.01)
(52) U.S. Cl.
CPC .................................. G01M 17/02 (2013.01)
(58) Field of Classification Search
CPC .................................................... G01M 17/02
See application file for complete search history.

(56) References Cited

U.S. PATENT DOCUMENTS 5,917,726 A    6/1999  Pryor
8,972,035 B2   3/2015  Hair et al.
(Continued)

FOREIGN PATENT DOCUMENTS

WO    WO 2011/159272    12/2011
WO    WO 2012/003022    1/2012
WO    WO 2013/039505    3/2013

OTHER PUBLICATIONS

PCT International Search Report for PCT/US2013/034612, dated Jun. 25, 2013—10 pages.

Primary Examiner — Alexander Satanovsky
(74) Attorney, Agent, or Firm — Dority & Manning, P.A.

(57) ABSTRACT

Systems and methods for improving the uniformity of a tire based on estimated process harmonic magnitudes for one or more process effects are provided. Magnitudes of process harmonics associated with one or more candidate process effects can be determined from the observed magnitudes of one or more harmonics of measured uniformity parameters. The estimated process harmonic magnitude(s) can be determined without requiring phase angle or azimuth information associated with the observed magnitudes. The estimated process harmonic magnitude(s) can be determined by identifying a process harmonic magnitude pattern for identified candidate process effects. A model can be constructed correlating the candidate magnitudes specified by the process harmonic magnitude pattern with observed magnitudes of corresponding harmonics of a measured uniformity waveform. Regression or programming techniques can be used to estimate coefficients associated with candidate magnitude terms in the model.

9 Claims, 7 Drawing Sheets

(56) References Cited

U.S. PATENT DOCUMENTS

| | | |
|---|---|---|
| 2001/0043450 A1 | 11/2001 | Seale et al. |
| 2004/0093106 A1 | 5/2004 | Stuckey |
| 2012/0035757 A1 | 2/2012 | Mawby et al. |
| 2012/0095587 A1* | 4/2012 | Hair, Jr. ............... G01M 17/024 700/110 |
| 2013/0090879 A1* | 4/2013 | Estor .................... G01M 17/02 702/97 |
| 2013/0098148 A1* | 4/2013 | Mawby ................ G01M 17/02 73/146 |

* cited by examiner

TIRE UNIFORMITY THROUGH IDENTIFICATION OF PROCESS EFFECTS USING REGRESSION ANALYSIS WITHOUT AZIMUTH DATA

FIELD OF THE INVENTION

The present disclosure relates generally to systems and methods for improving tire uniformity, and more particularly to analyzing and improving the uniformity of tires based on estimated magnitudes of process harmonics.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

A measured uniformity waveform for a tire can result from uniformity dispersions due to both tire effects as well as process effects. Examples of tire effects include those due to tire material components (e.g., the product start point or joint overlap location of one or more of casing textile plies, belt plies, bead rings, inner liner, tread and other rubber layers of the tires), manufacturing techniques (e.g., the relative location in which a green tire is introduced on a building drum, placed into a mold or curing press, and the like), and/or controllable conditions used in the tire construction process (e.g., the temperature and pressure at which green tires are subjected during the curing process or other manufacturing steps.) Examples of process effects may arise from such manufacturing conditions as a roller influence, extruder surge, fluctuation in a process condition (e.g., temperature, pressure, speed, etc.) and others. The impact of tire effects and process effects within a measured uniformity waveform are respectively represented by "tire harmonic" or "process harmonic" components of the composite uniformity waveform.

The respective tire harmonics obtained from a measured uniformity waveform can be analyzed in accordance with known processes to improve tire uniformity. However, this analysis can be hindered by the impact of process effects whose periodic contributions to the composite uniformity waveform are not identical to the tire harmonics, resulting in poorer compensations and adjustments. Identification of such process harmonic uniformity contributions can help improve uniformity analysis as well as the tire building process.

Techniques are known to estimate the magnitude of process effect contributions. For example, one technique provides for the construction of rectangular coefficient coordinates associated with sine and cosine terms for each of a plurality of candidate process harmonics for a measured uniformity waveform for a tire. The rectangular coordinates can be solved for using, for instance, a regression analysis, and used to estimate the magnitude of each process harmonic. Since the rectangular coordinates are associated with both sine and cosine terms, the coordinates will be functions of both magnitude and phase angle (i.e. azimuthal location of the peak on the tire) of the process harmonics.

In certain cases, however, the phase angle may not be available or is otherwise desired not to be used. For instance, determination of the phase angle may require that a barcode or other indicator is attached to the tire during its manufacture to act as a reference point for measurement of the uniformity waveform. If this capability is absent from the manufacturing equipment, then the phase angle cannot be determined In other instances, the phase angle may never have been computed or stored in a memory for future use. In these cases, the above-mentioned analysis techniques may not be able to estimate process harmonic magnitudes.

Thus, a need exists for a system and method for estimating magnitudes of process harmonic contributions without relying on phase angle information for the candidate process harmonics.

SUMMARY OF THE INVENTION

Aspects and advantages of the invention will be set forth in part in the following description, or may be apparent from the description, or may be learned through practice of the invention.

One exemplary aspect of the present disclosure is directed to a method for improving the uniformity of a tire. The method includes identifying at least one candidate process effect and identifying a process harmonic magnitude pattern for the at least one candidate process effect. The process harmonic magnitude pattern specifies a candidate magnitude for each of one or more process harmonics of the at least one candidate process effect. The method further includes obtaining an observed magnitude for each of one or more harmonics of a measured uniformity parameter for each tire in a plurality of test tires. The method further includes determining, with the computing device, an estimated process harmonic magnitude for each of the one or more process harmonics based at least in part on the candidate magnitude associated with the process harmonic and the observed magnitude associated a corresponding harmonic of the measured uniformity parameter for each tire in the set of one or more test tires. In a particular implementation, the estimated process harmonic magnitude for each of the one or more process harmonics is estimated without observed phase angle information for the one or more harmonics of the measured uniformity parameter. The method further includes modifying tire manufacture based at least in part on the estimated process harmonic magnitude determined for each of the one or more process harmonics of the at least one candidate process effect.

Another exemplary aspect is directed to a system for improving the uniformity of tires. The system includes a measurement machine configured to measure a uniformity waveform for each tire in a plurality of test tires. The system further includes a computing device coupled to the measurement machine. The computing device includes one or more processors and at least one non-transitory computer-readable memory. The memory stores computer-readable instructions that when executed by the one or more processors causes the one or more processors to implement any of the methods for determining estimated process harmonic magnitudes according to the exemplary embodiments disclosed herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1(a) plots the uniformity parameter along the ordinate and the azimuthal location about the tires along the abscissa.

FIG. 1(a) plots the uniformity parameter along the ordinate and the azimuthal location about the tires along the abscissa.

FIG. 1(c) plots the measured uniformity parameter along the ordinate and the azimuthal location about the tires along the abscissa.

FIG. 3 plots magnitude along the ordinate and specific process harmonic (e.g. $1^{st}$ harmonic, $2^{nd}$ harmonic, etc.) along the abscissa.

FIG. 4 plots magnitude along the ordinate and specific process harmonic (e.g. $1^{st}$ harmonic, $2^{nd}$ harmonic, etc.) along the abscissa.

FIG. 8 plots magnitude along the ordinate and period of the process harmonic along the abscissa.

FIG. 9 plots magnitude along the ordinate and phase angle (i.e. azimuth) along the abscissa.

FIG. 10 plots number of tires along the ordinate and magnitude along the abscissa.

FIG. 11 plots number of tires along the ordinate and magnitude along the abscissa.

DETAILED DESCRIPTION

Figure 1A:
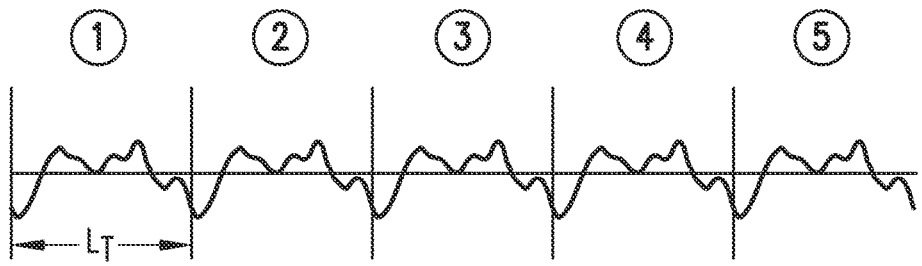
FIG. 1(a) depicts uniformity waveforms associated with tire effects for five representative tires.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improving tire uniformity using estimates of process harmonic magnitude(s) associated with at least one candidate process effect. In analyzing tire uniformity, a variety of different uniformity parameters can be measured for a plurality of tires. The obtained uniformity measurements generally correspond to a composite uniformity waveform representative of uniformity measurements at a plurality of points about the circumference of the tire. The uniformity waveform can be decomposed, for instance using a Fourier analysis, into many respective harmonics.

Tires, even when manufactured under like conditions, can be subject to variation in uniformity due to cyclic manufacturing variations in two primary ways. In a first case, periods of the manufacturing variation coincide with the tire circumference. These effects are referred to as tire effects because they are associated with the tire circumference. Tire effects can generally be composed of various tire harmonics that have a period that fits an integer number of times within the circumference of the tire. Typical tire effects can be attributable to tread joint width, out-of-roundness of the building drums, press effects, and other effects.

In a second case, the periods of the manufacturing variations do not coincide with the tire circumference. These effects are referred to as process effects because they are related to process elements rather than tire circumference. Process effects can generally be composed of process harmonics that have a period that does not fit an integer number of times within the circumference of the tire. Typical process effects can be caused, for instance, in the preparation of a semi-finished product (e.g. a tread band), by thickness variations due to the extruder control system or by rollers that can deform the shape of softer products.

According to aspects of the present disclosure, estimated process harmonic magnitude(s) of one or more process harmonics associated with at least one candidate process effect can be determined from the observed magnitude(s) of one or more harmonics of measured uniformity parameters. The estimated process harmonic magnitude(s) can be determined without requiring phase angle or azimuth information associated with the observed magnitude(s). In this way, the systems and methods of the present disclosure can provide a simplified approach to identifying process harmonic magnitude(s) that can be used in circumstances when phase angle information is not available and/or to simplify the estimation process.

More particularly, the estimated process harmonic magnitude(s) can be determined without phase angle information by identifying a process harmonic magnitude pattern for identified candidate process effects. It has been discovered that a given candidate process effect has an associated pattern of candidate magnitudes for one or more process harmonics of the candidate process effect. A model can be constructed correlating the candidate magnitudes specified by the process harmonic magnitude pattern with observed magnitudes of corresponding harmonics of a measured uniformity waveform. Regression or programming techniques can be used to estimate coefficients associated with candidate magnitude terms in the model. The estimated process harmonic magnitudes can then be determined from the estimated coefficients.

The estimated process harmonic magnitude(s) can be used to better analyze the measured uniformity parameter and to determine the uniformity contributions from tire harmonics versus process harmonics. This analysis can ultimately lead to improvements in the tire manufacturing processes. For instance, the estimated process harmonic magnitude(s) can be compared to thresholds to determine if corrective action need to be taken. The particular process harmonic can be used to determine the offending part of the tire manufacturing process that needs to be corrected/adjusted. As another example, the estimated process harmonic magnitude(s) can be determined across different time intervals. The estimated process harmonic magnitudes(s) can be compared across the time intervals to determine the stability of the process effects and to determine if any new upsets in the manufacturing process have occurred. For instance, if an estimated process harmonic magnitude changes across different time intervals, this can provide an indication of the need for a maintenance event to address the particular process harmonic.

Figure 1B:
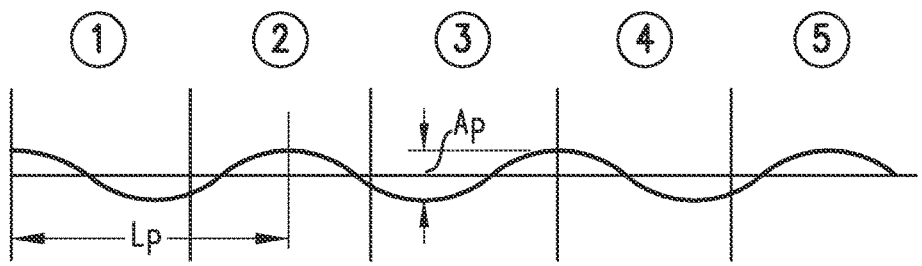
FIG. 1(b) depicts a uniformity waveform associated with a process effect.
Figure 1C:
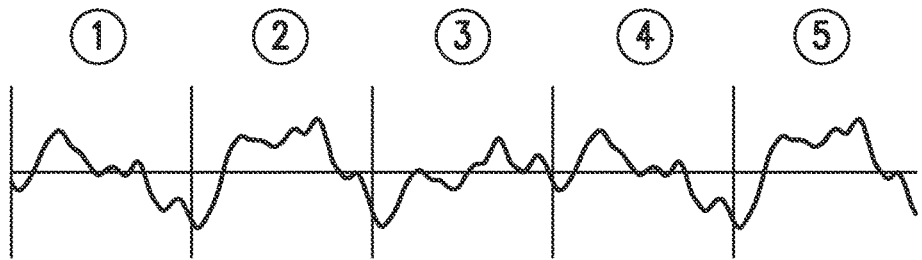
FIG. 1(c) depicts a composite uniformity waveform measured for the five representative tires and combining both the tire effect and process effect.

Referring now to the FIGS., exemplary embodiments of the present disclosure will now be discussed in detail. FIGS. 1(a)-1(c) provide a graphical representation of how a process harmonic can add to existing tire harmonics to cause uniformity variations across a plurality of tires. In FIG. 1(a), the graphic represents uniformity waveforms associated with tire effects for five respective test tires. The uniformity waveform can be, for instance, a radial force variation waveform or other suitable uniformity waveform. Notice that the uniformity waveform associated with the tire effects for each tire is substantially similar. The uniformity waveforms of FIG. 1(a) can be composed of a number of different tire harmonics, each of which fit an integer number of times within the period defined by the circumference of the individual test tires, namely $L_T$.

FIG. 1(b) represents a model of an exemplary process effect that that can affect the uniformity dispersion of the tires. As shown, the process effect has a period $L_P$ that does not fit an integer number of times within the period defined by the tire circumference $L_T$. For the example depicted in FIG. 1(b), the process effect has a period $L_P$ that is approximately 1.5 times the tire circumference, $L_T$. The process effect has a magnitude (e.g. peak to peak amplitude) of $A_P$.

FIG. 1(c) represents the sequential observed (i.e. measured) composite uniformity waveforms for the tires. As shown in FIG. 1(c), it is evident that the addition of a process effect to the tire effects can cause the maximum observed values within the measured uniformity waveform (or particular harmonic components thereof, e.g. the first harmonic of radial force variation) to vary from tire to tire even if all tire harmonics remain constant across the plurality of tires. The estimated magnitude of process effect contributions to an observed waveform can be used to better analyze uniformity measurements and/or to correct various aspects of the tire manufacturing process.

Figure 2:
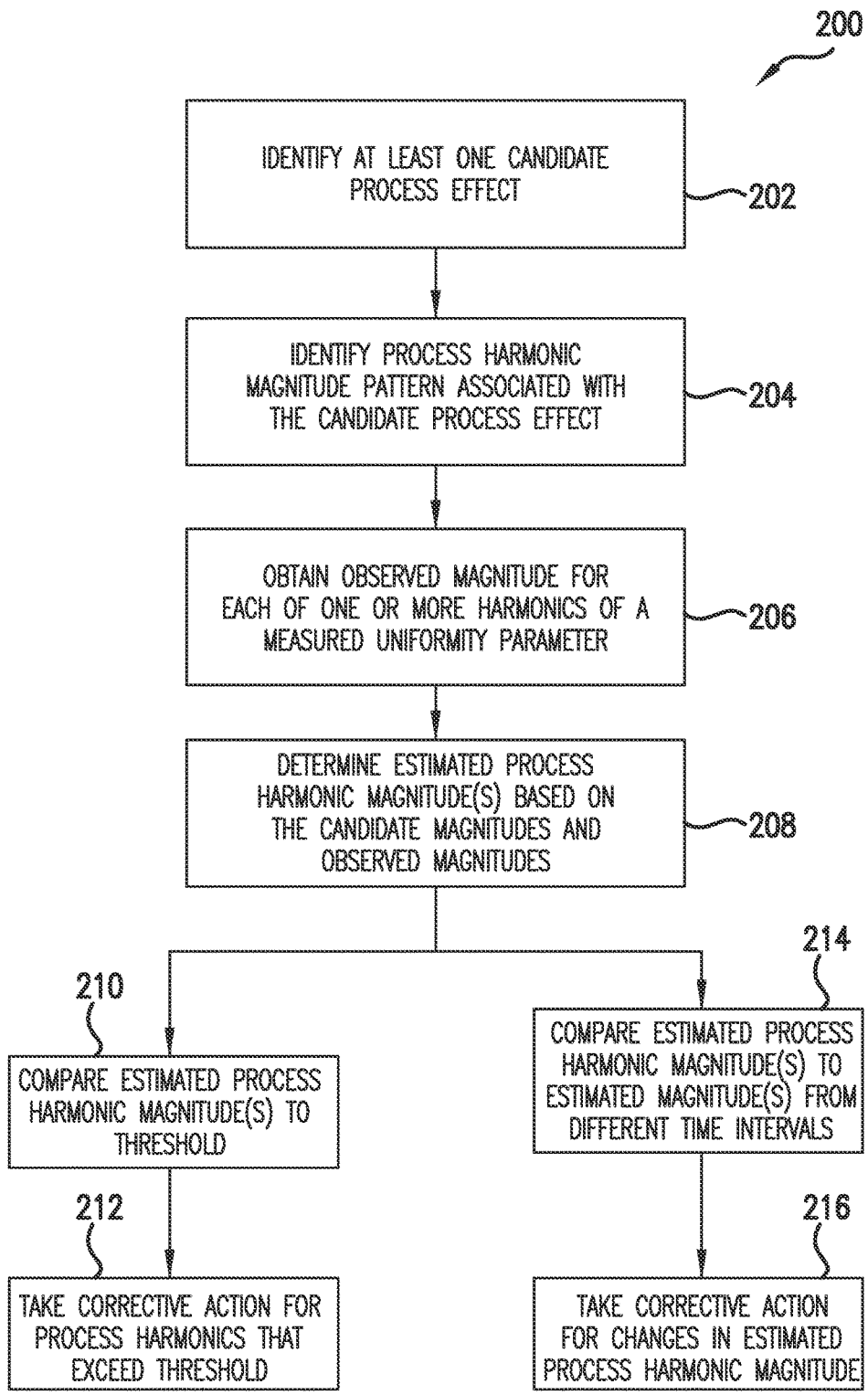
FIG. 2 depicts a flow diagram of an exemplary method for improving the uniformity of a tire according to an exemplary embodiment of the present disclosure.

FIG. 2 depicts a flow diagram of an exemplary method (200) for improving the uniformity of a tire using estimated process harmonic magnitudes associated with at least one candidate process effect according to an exemplary embodiment of the present disclosure. The method (200) can be implemented using any suitable system, such as the system depicted in FIG. 7. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of any of the methods disclosed herein can be omitted, rearranged, combined and/or adapted in various ways.

At (202), the method includes identifying at least one candidate process effect. A single process effect can be targeted as a candidate process effect for analysis or multiple process effects can be targeted as candidate process effects for analysis.

The at least one candidate process effect can be expressed or identified in terms of various parameters, including but not limited to the frequency or period of introduction relative to the dimensions of the tire (e.g., tire circumference, radius, diameter, discrete number of data points around the tire or the like). The rate of introduction can also be expressed as a harmonic number (e.g. 1.25, 0.8, etc.) The harmonic number can be related to the frequency ($\omega$) of the candidate process harmonic by the following formula: $2\pi h/N$, where h is the harmonic number and N is the number of data points measured around the periphery of a tire when obtaining a uniformity measurement. Frequency ($\omega$) can be quantified as Radians per data point measured around the tire. When considering a total number of p candidate process effects, the rate of introduction of each process effect can be defined in terms of its respective harmonic number $h_k$ and/or frequency of introduction $\omega_k$.

The candidate process effects can be known process effects identified based on certain known features of the manufacturing process, or the candidate process effects can be unknown. For instance, if the physical process sources are known, it can be possible to identify the candidate process effect(s) from certain aspects and/or conditions of the manufacturing process.

If the candidate process effects are unknown, the candidate process effects can be identified by specifying a series of candidate process effects in stepped increments over a range of candidate process effects. (e.g. 0.2, 0.3, 0.4 . . . 1.5, etc.). A regression/programming analysis can identify process effects in the range of candidate process effects by solving for coefficients associated with each incremental candidate process effect in the range. Process effects associated with non-zero coefficients can be determined to contribute to the overall uniformity of the tire. Other suitable techniques can be used to identify candidate process effects without deviating from the scope of the present disclosure.

Referring to FIG. 2 at (204), a process harmonic magnitude pattern is identified for the at least one process effect. It has been discovered that each candidate process effect can have a specific process harmonic magnitude pattern that can be used to differentiate the process effect from others. For instance, a candidate process effect associated with harmonic number 1.2 will have a different process harmonic magnitude pattern than a candidate process effect associated with harmonic number 0.9. Similar to a measured uniformity waveform, a candidate process effect can be broken down into one or more process harmonic components. The process harmonic magnitude pattern specifies a candidate magnitude for one or more process harmonics associated with the candidate process effect.

Figure 3:
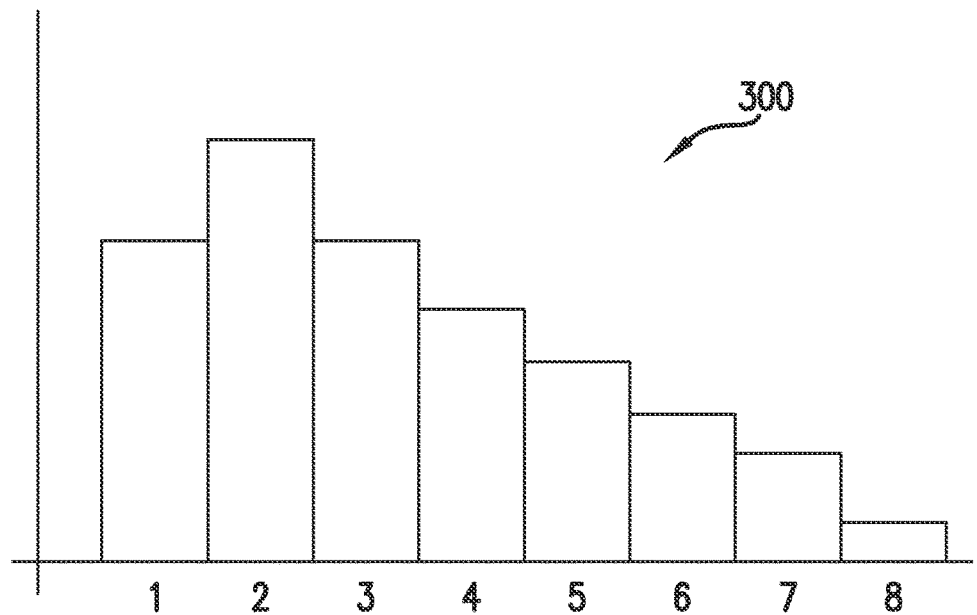
FIG. 3 depicts a histogram of exemplary candidate magnitudes for a process harmonic magnitude pattern associated with a first process effect.

To illustrate this principle, FIG. 3 depicts an exemplary representation of a process harmonic magnitude pattern 300 associated with a first candidate process effect. The process harmonic magnitude pattern 300 specifies a plurality of candidate magnitudes for each of a plurality of process harmonics (e.g. $1^{st}$ harmonic, 2d harmonic, 3d harmonic, etc.).

Figure 4:
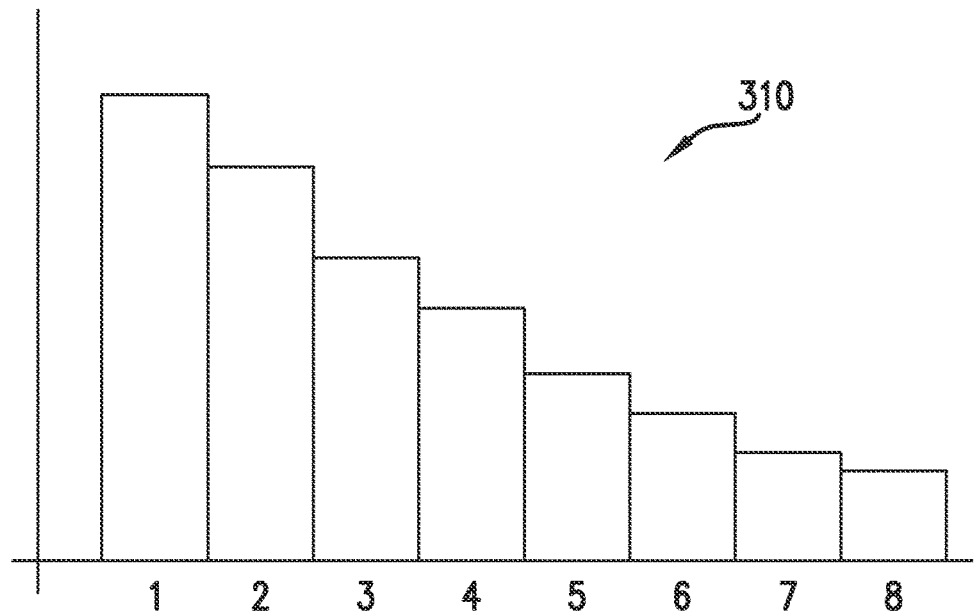
FIG. 4 depicts a histogram of exemplary candidate magnitudes for a process harmonic magnitude pattern associated with a second process effect.

FIG. 4 depicts an exemplary representation of a process harmonic magnitude pattern 310 associated with a second candidate process effect. The process harmonic magnitude pattern 310 also specifies a plurality of candidate magnitudes for each of a plurality of process harmonics (e.g. $1^{st}$ harmonic, 2nd harmonic, 3rd harmonic, etc.). As shown in FIGS. 3 and 4, however, the candidate magnitudes associated with the first candidate process effect are different from the candidate magnitudes associated with the second candidate process effect.

The process harmonic magnitude pattern for a specific candidate process harmonic can be generated without phase angle information by modeling each process effect k of p candidate process effects as a pure cosine curve running h times through each tire, where h is the harmonic number associated with the particular candidate process effect k. The Fourier transform is performed for each process effect k to generate cosine and sine terms associated with each process harmonic for the process effect k. The candidate magnitude pattern for each process harmonic of the candidate process effect k can be generated from the cosine term generated for each process harmonic.

This illustrated by the following operation below:

$$\begin{bmatrix} x_1^1 & x_1^2 & \cdots & x_1^p \\ x_2^1 & x_2^2 & \cdots & x_2^p \\ \vdots & \vdots & \vdots & \vdots \\ x_N^1 & x_N^2 & \cdots & x_N^p \end{bmatrix} \rightarrow \begin{bmatrix} c_1^1 & s1_1^1 & \cdots & c_1^p & s_1^p \\ c_2^1 & s_2^1 & \cdots & c_2^p & s_2^p \\ \vdots & \vdots & & \vdots & \vdots \\ c_{\frac{N}{2}}^1 & s_{\frac{N}{2}}^1 & \cdots & c_{\frac{N}{2}}^p & s_{\frac{N}{2}}^p \end{bmatrix} \rightarrow \begin{bmatrix} m_1^1 & m_1^2 & \cdots & m_1^p \\ m_2^1 & m_2^2 & \cdots & m_2^p \\ \vdots & \vdots & \vdots & \vdots \\ m_{\frac{N}{2}}^1 & m_{\frac{N}{2}}^2 & \cdots & m_{\frac{N}{2}}^p \end{bmatrix}$$

$x_1^k$ through $x_n^k$ represents the modeled process effect as a pure cosine wave for data points n=1, 2, . . . , N around the tire for k=1 to k=p process effects. $c_1^k$ through $c_{N/2}^k$ represent the cosine terms and $s_1^k$ through $s_{N/2}^k$ represent the sine terms for a plurality of process harmonics obtained through Fourier analysis of each process effect k for k=1 to k=p process effects. $m_1^k$ through $m_{N/2}^k$ represent the candidate magnitudes obtained in the standard way (e.g. $m_i^p = \sqrt{(c_i^p)^2 + (s_i^p)^2}$ for each process harmonic of the k=1 to k=p process effects. The candidate magnitudes for each process effect represent the process harmonic magnitude pattern associated with each process effect. Unless otherwise indicated, superscripts are used herein for identification purposes and are not exponents.

Identifying the process harmonic magnitude pattern associated with each process effect (204) can include accessing a pre-computed process harmonic magnitude pattern associated with each candidate process effect stored in a memory. Alternatively, the method can include computing the process harmonic magnitude pattern for each candidate process effect on the fly after identifying the candidate process effect using the above techniques.

Process effects represented by the same harmonic number but with different magnitudes are associated with the same process harmonic magnitude pattern. For example, a process effect represented by harmonic number 0.8 with magnitude 1.0 as a process effect represented by harmonic number 0.8 with magnitude 2.0. The magnitudes of the actual process harmonics for the respective process effects however will be different based on the magnitude of the process effect. In this way, the candidate magnitudes specified by the process harmonic magnitude pattern can act as multipliers for estimating process harmonic magnitudes associated with a candidate process effect. As a result, estimated process harmonic magnitudes can be obtained based solely on magnitude information without requiring phase angle or azimuth information.

To determine the estimated process harmonic magnitudes associated with the process effect, the method at (206) includes obtaining observed magnitude(s) for one or more harmonics of a measured uniformity parameter for each tire in a set of one or more tires. The observed magnitude(s) can be derived from a measured uniformity parameter for each tire. In one embodiment, the observed magnitude(s) can be previously derived from the measured uniformity parameters and stored in a memory. Obtaining the observed magnitudes can include accessing the observed magnitudes stored in the memory. In another embodiment, obtaining the observed magnitudes can include computing the observed magnitudes from measured uniformity parameters in conjunction with measuring the uniformity parameters.

Figure 5:
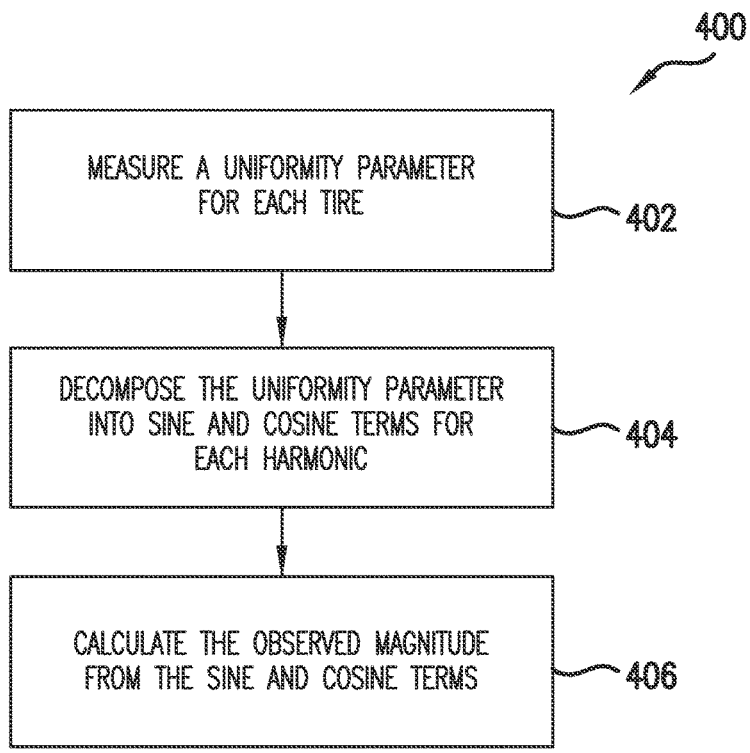
FIG. 5 depicts a flow diagram of an exemplary method for obtaining an observed magnitude for each of one or more harmonics of a measured uniformity parameter according to an exemplary embodiment of the present disclosure.

FIG. 5 depicts a flow diagram of an exemplary method (500) of determining observed magnitude(s) for one or more harmonics of a measured uniformity parameter for each tire in the set of one or more test tires according to an exemplary embodiment of the present disclosure. At (502), the method includes measuring a uniformity parameter for each tire in the set of one or more tires. It should be appreciated that even though all test tires are made in accordance with the same or similar manufacturing process, it is possible that some process effects will not manifest their maximum influence in every tire. For example, a process effect having a harmonic number less than 1.0 may only present its maximum amplitude in every other tire, every third tire, etc. in a consecutively manufactured set of tires.

The measured parameter can correspond, for example, to such uniformity parameters as radial run out (RRO), lateral run out (LRO), mass variance, balance, radial force variation (RFV), lateral force variation (LFV) and tangential force variation (TFV). The measured parameter often corresponds to a waveform constructed from a number of data points measured in equally spaced points during one rotation of a tire (e.g., 128, 256, 512 or other number of data points per tire revolution).

Consider a measured uniformity parameter (w) that is obtained at a plurality of equally spaced data points N around a tire such that measurements are obtained at respective data points $w_n$, for n=1, 2, . . . , N. It should be appreciated that the actual $w_n$ values may be conditioned in accordance with a variety of known techniques. For example, the $w_n$ values may be obtained at more than just a single rotation of a tire by averaging the obtained values at each data point during multiple rotations of the tire. In another example, the $w_n$ values may be conditioned by subtracting out the average magnitude value of the measured uniformity parameter across all respective data points such that the composite data waveform is centered.

At (504), the measured uniformity parameter can be decomposed into multiple harmonics. For instance, the measured uniformity parameter can be decomposed into sine and cosine terms for each of a plurality of harmonics of the uniformity parameter. The sine and cosine terms can represent the contribution of each harmonic to each measured data point $w_n$ around a tire.

At (406), the observed magnitude for each harmonic can be calculated from the sine and cosine terms associated with the harmonic. For instance, the observed magnitude $m_j^w$ associated with each harmonic j can be computed according to the following:

$$m_j^w = \sqrt{(c_j^w)^2 + (s_j^w)^2}$$

$c_j^2$ represents the coefficient associated with the cosine term for each harmonic j.
$s_j^2$ represents the coefficient associated with the sine term for each harmonic j.

An exemplary operation for obtaining observed magnitudes for a tire is provided below:

$$\begin{bmatrix} w_1 \\ w_2 \\ \vdots \\ w_N \end{bmatrix} \rightarrow \begin{bmatrix} c_1^w & s_1^w \\ c_2^w & s_2^w \\ \vdots & \vdots \\ c_{N/2}^w & s_{N/2}^w \end{bmatrix} \rightarrow \begin{bmatrix} m_1^w \\ m_2^w \\ \vdots \\ m_{N/2}^w \end{bmatrix}$$

$w_1$ through $w_N$ represent the measured uniformity parameter for data points n=1, 2, ..., N around the tire. $c_1^2$ through $c_{N/2}^2$ represent the cosine terms and $s_1^2$ through $s_{N/2}^w$ represent the sine terms for harmonics j=1 to j=N/2. $m_1^2$ through $m_{N/2}^w$ represent the observed magnitudes for harmonics j=1 to j=N/2.

Referring back to FIG. 2 at (208), once the observed magnitude(s) for the one or more harmonics of the measured uniformity parameter have been obtained, the estimated process harmonic magnitudes for the candidate process effect can be determined based on the candidate magnitude(s) specified by the process harmonic magnitude pattern for the candidate process effect and the observed magnitude(s) derived from the measured uniformity parameter. The estimated process harmonic magnitudes for the candidate process effect can be determined without requiring phase angle information associated with the measured uniformity parameter.

Figure 6:
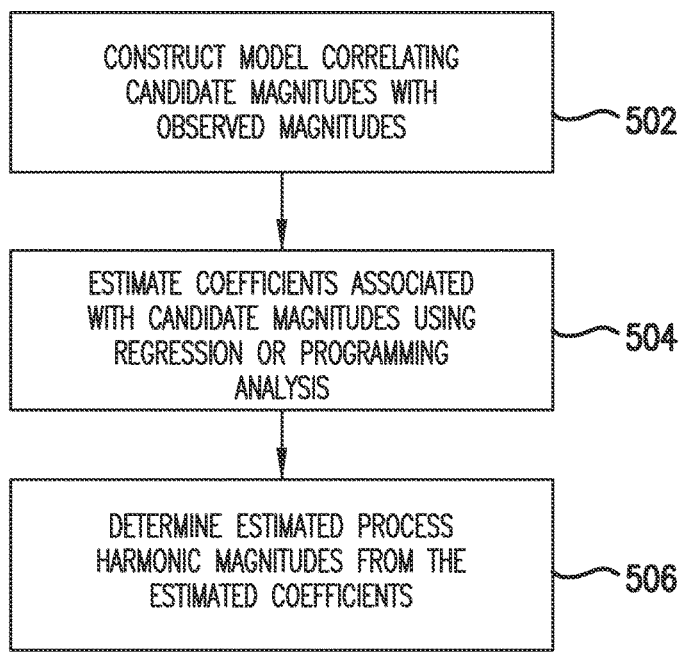
FIG. 6 depicts a flow diagram of an exemplary method for determining an estimated process harmonic magnitude from the candidate magnitude(s) and the observed magnitude(s).

FIG. 6 depicts a flow diagram of an exemplary method (600) for determining the estimated process harmonic magnitude for the process harmonics of a candidate process effect according to an exemplary embodiment of the present disclosure. At (502), the method includes constructing a model correlating the candidate magnitude(s) associated with each of the one or more process harmonics with the observed magnitude(s) for the corresponding harmonic of the measured uniformity parameter. An exemplary model is provided below:

$$w = P \cdot \beta + \epsilon$$

w represents the observed magnitude(s) associated with one or more harmonics of the measured uniformity parameter, P represents the candidate magnitude(s) associated with one or more process harmonics of the candidate process effect, β represents coefficient(s) for each of the one or more process harmonics, and ε represents a residual(s).

The following provides an example of a model fitted for t tires with j=64 armonics and p candidate process effects. Notice that there is only one coefficient β for each process effect and that it takes a fixed value across all harmonics and tires.

$$\begin{bmatrix} m_{1,1}^w \\ m_{1,2}^w \\ \vdots \\ m_{1,64}^w \\ m_{2,1}^w \\ m_{2,1}^w \\ \vdots \\ m_{2,64}^w \\ \vdots \\ m_{t,1}^w \\ m_{t,2}^w \\ \vdots \\ m_{t,64}^w \end{bmatrix} = \begin{bmatrix} m_{1,1}^1 & m_{1,1}^2 & \cdots & m_{1,1}^p \\ m_{1,2}^1 & m_{1,2}^2 & \cdots & m_{1,2}^p \\ \vdots & \vdots & \vdots & \vdots \\ m_{1,64}^1 & m_{1,64}^2 & \cdots & m_{1,64}^p \\ m_{2,1}^1 & m_{2,1}^2 & \cdots & m_{2,1}^p \\ m_{2,1}^1 & m_{2,2}^2 & \cdots & m_{2,2}^p \\ \vdots & \vdots & \vdots & \vdots \\ m_{2,64}^1 & m_{2,64}^2 & \cdots & m_{2,64}^p \\ \vdots & \vdots & \vdots & \vdots \\ m_{t,1}^1 & m_{t,1}^2 & \cdots & m_{t,1}^p \\ m_{t,2}^1 & m_{t,2}^2 & \cdots & m_{t,2}^p \\ \vdots & \vdots & \vdots & \vdots \\ m_{t,64}^1 & m_{t,64}^2 & \cdots & m_{t,64}^p \end{bmatrix} \cdot \begin{bmatrix} \beta^1 \\ \beta^2 \\ \vdots \\ \beta^p \end{bmatrix} + \begin{bmatrix} \epsilon_{1,1} \\ \epsilon_{1,2} \\ \vdots \\ \epsilon_{1,64} \\ \epsilon_{2,1} \\ \epsilon_{2,2} \\ \vdots \\ \epsilon_{2,64} \\ \vdots \\ \epsilon_{t,1} \\ \epsilon_{t,2} \\ \vdots \\ \epsilon_{t,64} \end{bmatrix}$$

At (504), the coefficient β for each of the one or more process harmonics of the candidate process effect is estimated using a regression analysis or a programming analysis. Regression analysis can estimate coefficients β to minimize the squared residuals ε and can provide many statistical measures such as hypothesis tests and confidence intervals that can be valuable. Programming analysis can minimize the absolute value of the residuals ε.

If the candidate process harmonics includes known process harmonics, then a regression or programming solution that estimates non-zero coefficients for all candidate process harmonics will be sufficient. However, if a search for unknown process harmonics is contemplated, a stepwise regression or lasso approach can be used to find a sparse solution in which only coefficients of some subset of the candidate process harmonics will be selected.

An exemplary programming analysis can minimize the following objective function:

$$\min \sum_{r=1}^{t*j} |\epsilon_r| + \lambda \sum_{p=1}^{P} \beta^p$$

with $\beta^p \geq 0$. The first term in the objective function minimizes the sum of the absolute values of the errors and the second term regularizes the solution by penalizing the choice of too many non-zero estimates. If the process harmonics are known, the parameter λ can be set to zero. If the process harmonics are unknown, the parameter λ, can be used as a tuning parameter to balance the sparseness of the solution versus the goodness of fit. The constraint that the estimates are non-negative ensures that terms cannot simply cancel one another. Other constraints can be added to the programming analysis.

Once the coefficients have been estimated, the estimated process harmonic magnitude for each of the one or more process harmonic for the candidate process harmonics can be determined based on the coefficients as shown at (506) of FIG. 6. For instance, the coefficient can be multiplied by the candidate magnitude associated with the process harmonic to obtain the estimated process harmonic magnitude for the process harmonic. The estimated process harmonic magnitudes can be analyzed to assess the at least one candidate process effect, such as the estimated magnitude associated with the at least one candidate process effect.

The estimated process harmonic magnitude(s) can be used to better analyze uniformity measurements and/or to correct various aspects of the tire manufacturing process. For instance, referring to FIG. 2 at (210), the estimated process harmonic magnitudes can be compared to thresholds. Corrective action can be taken for process harmonics that exceed the threshold (212). The particular process harmonic can be used to determine the offending part of the tire manufacturing process that needs to be corrected/adjusted. This can be particularly beneficial in cases where the analysis techniques disclosed herein are used to search for unknown candidate process harmonics.

For example, once a process effect associated with a particular harmonic number (e.g. 1.2) is identified, the process effect can be used to track back to the process effect cause by first identifying possible cyclic elements in the tire manufacturing process. The relative period of these cyclic elements (e.g.1.5 m, 1.33 m, 1.00 m and 0.75 m) can be computed and compared to the circumference of the tire (e.g. 1.2 m). This gives the process harmonic number for each potential cause (0.8, 0.9, 1.2 and 1.6). Then one can select the closest matching potential cause to the identified active process harmonic.

For instance, an extruder cycle can be matched with a process effect having a harmonic number of 1.2 in tread thickness variation. If the amplitude of the process effect exceeds a given level (e.g. 0.25 kg force) then corrective action can be taken to address the extruder cycle. Such corrective action can include retuning the extruder control system algorithm, changing the extruder speed, and/or purposely stretching the tread to counteract the variation.

As another example, the estimated process harmonic magnitude(s) can be determined across different time intervals of the manufacturing process. The estimated process harmonic magnitudes(s) can be compared across the time intervals (212) to assess the stability of the process effects and to determine if any new upsets in the manufacturing process have occurred. For instance, if an estimated process harmonic magnitude changes across different time intervals, this can provide an indication of the need for a maintenance event to address the particular process effect. Corrective action can be taken to address changes in the estimated process harmonic magnitude(s).

Figure 7:
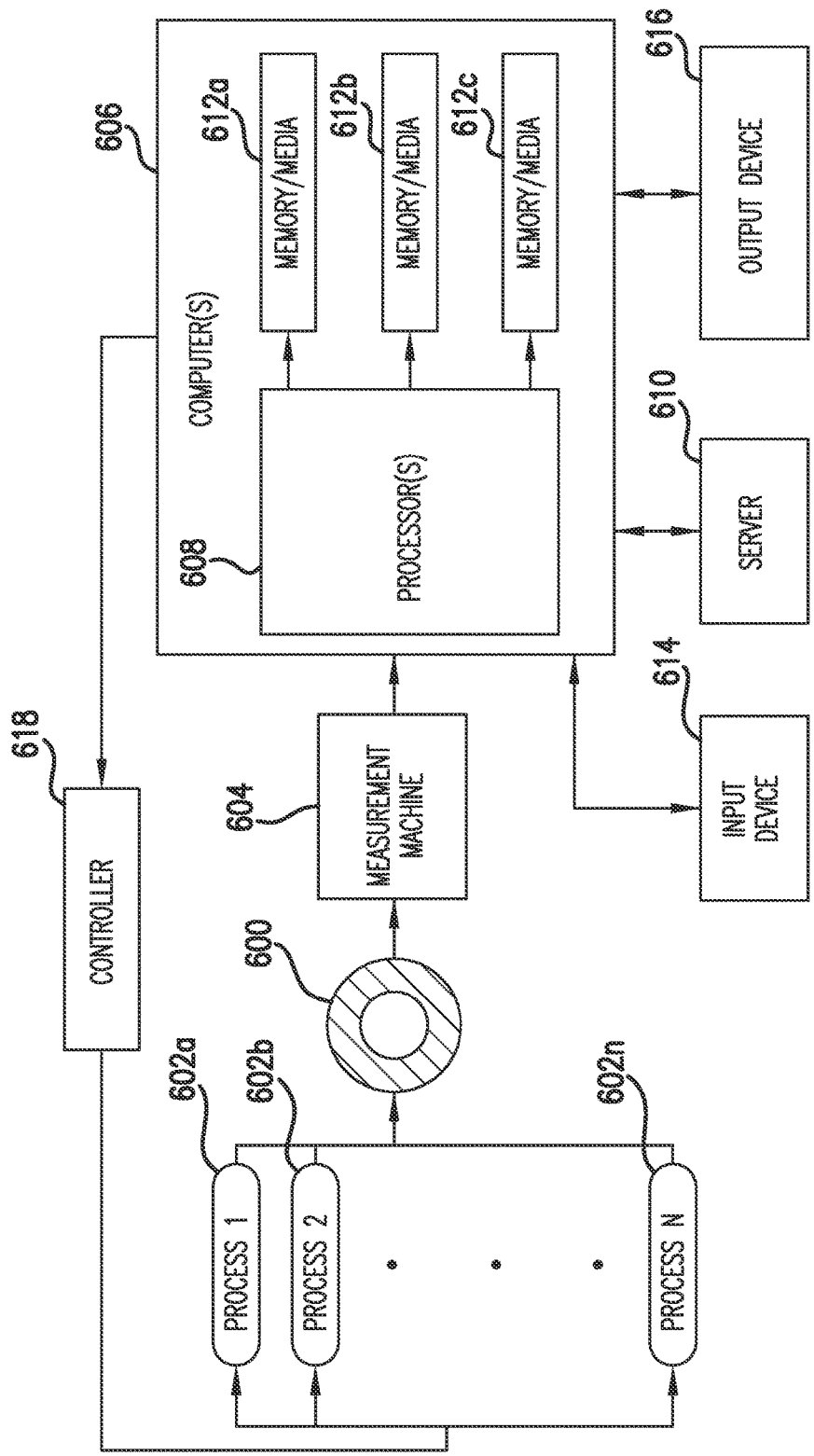
FIG. 7 depicts an exemplary system for improving the uniformity of a tire according to an exemplary embodiment of the present disclosure.

Referring now to FIG. 7, a schematic overview of exemplary system components for implementing the above-described methods is illustrated. An exemplary tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing mold, and curing the finished green tire, etc. Such respective process elements are represented as 602a, 602b, . . . , 602n in FIG. 7 and combine to form exemplary tire 600. It should be appreciated that a batch of multiple tires can be constructed from one iteration of the various processes 602a through 602n.

Referring still to FIG. 7, a measurement machine 604 is provided to obtain the various uniformity measurements. In general, such a measurement machine can include such features as a mounting fixture on which a tire is mounted and rotated centrifugally at one or more speeds. In one example, laser sensors are employed to operate by contact, non-contact or near contact positioning relative to tire 600 in order to determine the relative position of the tire surface at multiple data points (e.g., 128 points) as it rotates about a center line. The measurement machine can also include a road wheel used to load the tire to obtain force measurements as the tire is rotated in the measurement machine 604.

The measurements obtained by measurement machine 604 can be relayed such that they are received at one or more computing devices 606, which may respectively contain one or more processors 608, although only one computer and processor are shown in FIG. 7 for ease and clarity of illustration. Processor(s) 608 may be configured to receive input data from input device 614 or data that is stored in memory 612. Processor(s) 608, can then analyze such measurements in accordance with the disclosed methods, and provide usable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 7 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in the memory elements 612a, 612b, and 612c to cause the processor to perform operations. The operations can include, identifying at least one candidate process effect; identifying a process harmonic magnitude pattern for the at least one candidate process effect; obtaining an observed magnitude, for instance from the memory, for each of one or more harmonics of a measured uniformity parameter for each tire in a set of one or more test tires; and determining, with the computing device, an estimated process harmonic magnitude for each of the one or more process harmonics based at least in part on the candidate magnitude associated with the process harmonic and the observed magnitude associated with a corresponding harmonic of the measured uniformity parameter for each tire in the set of one or more of test tires.

EXAMPLES

Radial force variation waveforms were obtained for a set of twenty (20) test tires. The radial force variation waveforms included data for 128 data points about the circumference of each tire. The waveforms were decomposed into 64 harmonics and observed magnitudes were obtained for each harmonic.

A candidate process effect associated with a harmonic number of 0.8 and corresponding process harmonic magnitude pattern was identified. Estimated process harmonic magnitudes for each of 64 process harmonics for the candidate process effect were determined using the regression techniques disclosed herein. The estimated process harmonic magnitudes were used to determine the magnitude of the process effect. In this example, the magnitude of the process effect was estimated as 1.25391. The known value of the process effect from the data associated with the test tires was 1.25.

Figure 8:
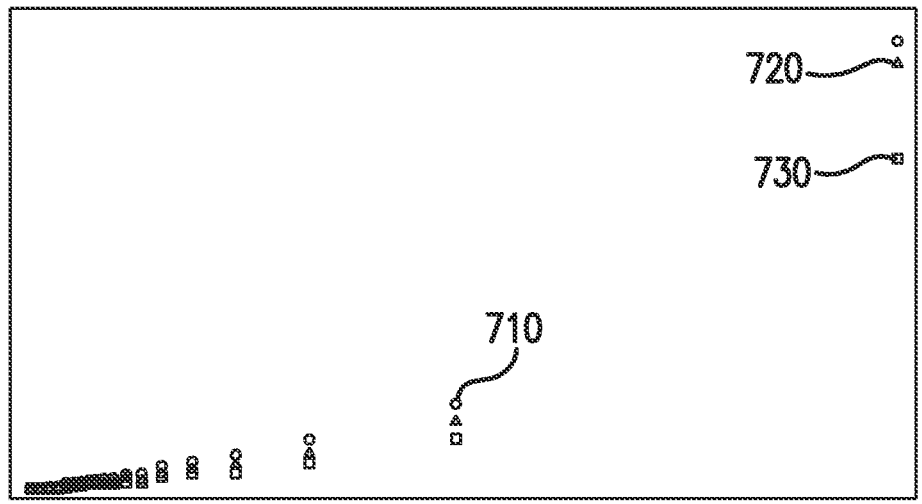
FIG. 8 depicts a plot comparing estimated process harmonic magnitudes determined according to exemplary embodiments of the present disclosure with an observed process harmonic pattern.

FIG. 8 depicts a plot comparing the estimated process harmonic magnitudes with an observed process harmonic pattern. In particular, curve 710 represents the process harmonic magnitudes associated with an observed process effect. Curve 720 represents the estimated process harmonic magnitudes determined according to exemplary aspects of the present disclosure. Curve 730 depicts the candidate magnitudes for the process harmonic magnitude pattern associated with the process effect. Notice that the estimated magnitudes provide a close match to the true magnitudes.

Figure 9:
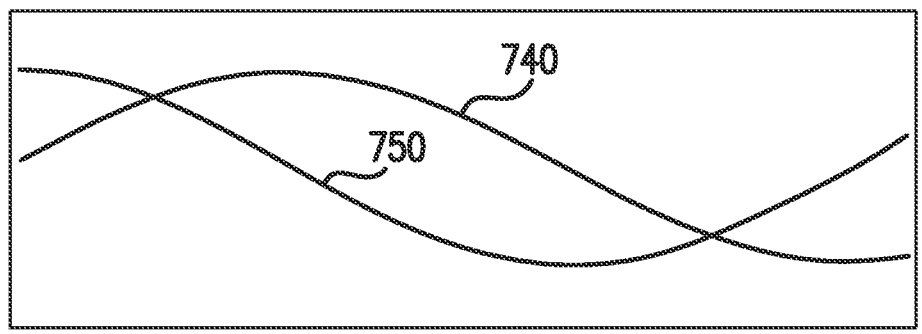
FIG. 9 depicts a plot comparing estimated and observed waveforms associated with a candidate process effect.

FIG. 9 depicts a plot of estimated and observed process effects. Curve 740 represents the observed the process effect. Curve 750 represents the estimated process effect. Curve 750 representing the estimated process effect is a pure cosine curve with a phase angle of zero. Only the magnitudes of curves 740 and 750 are comparable as the phase angle is not fitted using techniques according to aspects of the present disclosure. As illustrated, the estimated and observed magnitudes for the process effect are similar.

Figure 10:
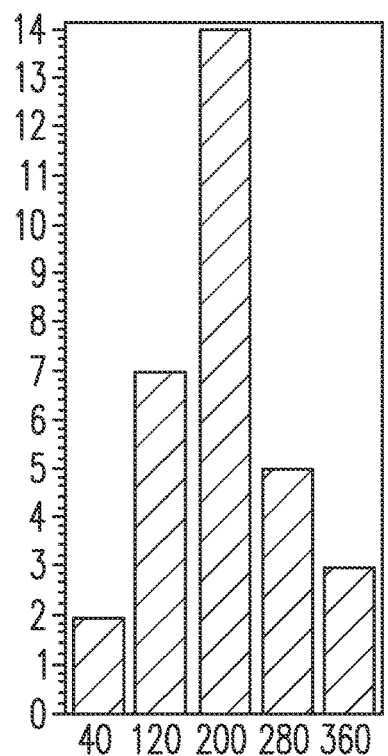
FIG. 10 depicts a histogram of estimate magnitudes for a set of test tires determined with magnitude and phase angle information for the test tires.

As another example, uniformity data was obtained for 31 tires. A radial run out process effect associated with harmonic number 0.8 was identified. Estimated magnitude of the process effect was determined using both magnitude and phase angle information. Sine and cosine curves were fitted for the first ten harmonics. The analysis gave a resultant average magnitude of 182.8 microns. FIG. 10 depicts a histogram of magnitudes by tire.

Figure 11:
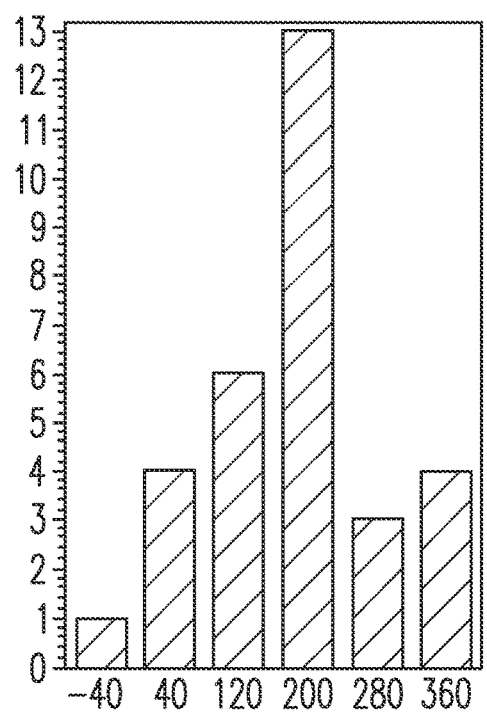
FIG. 11 depicts a histogram of estimate magnitudes for a set of test tires determined without phase angle information for the test tires according to an exemplary embodiment of the present disclosure.

Estimated magnitude of the radial run outprocess effect was then determined without phase angle information using the analysis techniques disclosed herein. Cosine curves were fitted for the first ten harmonics. The analysis gave a resultant average magnitude of 202.58 microns. FIG. 11 depicts a histogram of magnitudes by tire.

As another example, using data for the same 31 tires, a search for significant radial force variation process effects in the range of 0.5 harmonic number to 1.7 harmonic number was performed. Two harmonics were identified at 0.5 with a magnitude of 1.70 kg and at 1.40 with a magnitude of 1.05 kg.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for improving the uniformity of a tire, comprising:
    identifying at least one candidate process effect;
    identifying a process harmonic magnitude pattern for the at least one candidate process effect, the process harmonic magnitude pattern specifying a candidate magnitude for each of one or more process harmonics of the at least one candidate process effect;
    obtaining an observed magnitude for each of one or more harmonics of a measured uniformity parameter for each tire in a set of one or more test tires;
    determining, with the computing device, an estimated process harmonic magnitude for each of the one or more process harmonics based at least in part on the candidate magnitude associated with the process harmonic and the observed magnitude associated with a corresponding harmonic of the measured uniformity parameter for each tire in the set of one or more test tires; and
    modifying tire manufacture based at least in part on the estimated process harmonic magnitude determined for each of the one or more process harmonics of the at least one candidate process effect;
    wherein the estimated process harmonic magnitude is determined without requiring observed phase angle information for the one or more harmonics of the measured uniformity parameter;
    wherein determining, with the computing device, the estimated process harmonic magnitude for each of the one or more process harmonics comprises constructing a model correlating the candidate magnitude for each of the one or more process harmonics with the observed magnitude associated with the corresponding harmonic of the measured uniformity parameter;
    wherein the model is constructed such that observed magnitude associated with one or more process harmonics is determined as a function of a candidate magnitude associated with the one or more process harmonics multiplied by a coefficient for each of the one or more process harmonics, the product of the candidate magnitude and the coefficient being summed with a residual.

2. The method of claim 1, wherein the set of one or more test tires are made in a similar manufacturing process such that the at least one candidate process effect will manifest in the set of one or more test tires.

3. The method of claim 1, wherein identifying at least one candidate process effect comprises identifying a known process effect associated with the plurality of test tires.

4. The method of claim 1, wherein identifying at least one candidate process effect comprises identifying a set of candidate process effects stepped incrementally over a range of candidate process effects.

5. The method of claim 1, wherein obtaining an observed magnitude for each of one or more harmonics of a measured uniformity parameter for each tire comprises:
    measuring, with a uniformity measurement machine, a uniformity waveform for each tire in the set of one or more test tires;
    decomposing the uniformity waveform for each tire into sine and cosine terms for each of the one or more harmonics; and
    calculating the observed magnitude of each of the one or more harmonics from the sine and cosine terms.

6. The method of claim 1, wherein obtaining an observed magnitude for each of one or more harmonics of a measured uniformity parameter for each tire in a plurality of test tires comprises accessing the observed magnitude stored in a memory of a computing device.

7. The method of claim 1, wherein modifying tire manufacture comprises:
comparing the estimated process harmonic magnitude for each of the one or more process harmonics to a threshold; and
taking corrective action to address the estimated process harmonic when the estimated process harmonic magnitude exceeds the threshold.

8. The method of claim 1, wherein modifying tire manufacture comprises comparing the estimated process harmonic magnitude for each of the one or more process harmonics across a plurality of different time intervals to detect any process changes.

9. A system for improving the uniformity of tires, the system comprising
a measurement machine configured to measure a uniformity waveform for each tire in a plurality of test tires; and
a computing device coupled to the measurement machine, the computing device comprising one or more processors and at least one non-transitory computer-readable memory, the memory storing computer-readable instructions that when executed by the one or more processors causes the one or more processors to perform operations, the operations comprising:
identifying at least one candidate process effect;
identifying a process harmonic magnitude pattern for the at least one candidate process effect, the process harmonic magnitude pattern specifying a candidate magnitude for each of one or more process harmonics of the at least one candidate process effect;
obtaining an observed magnitude for each of one or more harmonics of a measured uniformity parameter for each tire in a set of one or more test tires; and
determining, with the computing device, an estimated process harmonic magnitude for each of the one or more process harmonics based at least in part on the candidate magnitude associated with the process harmonic and the observed magnitude associated with a corresponding harmonic of the measured uniformity parameter for each tire in the set of one or more test tires;
wherein the estimated process harmonic magnitude is determined without requiring observed phase angle information for the one or more harmonics of the measured uniformity parameter;
wherein determining, with the computing device, the estimated process harmonic magnitude for each of the one or more process harmonics comprises constructing a model correlating the candidate magnitude for each of the one or more process harmonics with the observed magnitude associated with the corresponding harmonic of the measured uniformity parameter;
wherein the model is constructed such that observed magnitude associated with one or more process harmonics is determined as a function of a candidate magnitude associated with the one or more process harmonics multiplied by a coefficient for each of the one or more process harmonics, the product of the candidate magnitude and the coefficient being summed with a residual.

* * * * *